(12) United States Patent
Yamazaki et al.

(10) Patent No.: US 8,836,836 B2
(45) Date of Patent: Sep. 16, 2014

(54) RADIATION IMAGING APPARATUS AND CONTROL METHOD FOR RADIATION IMAGING APPARATUS

(75) Inventors: Takashi Yamazaki, Kawasaki (JP); Kazumasa Matsumoto, Yokohama (JP); Hidehiko Saito, Saitama (JP); Kanako Dowaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/237,362

(22) Filed: Sep. 20, 2011

(65) Prior Publication Data

US 2012/0075507 A1    Mar. 29, 2012

(30) Foreign Application Priority Data

Sep. 29, 2010    (JP) .................................. 2010-219766

(51) Int. Cl.
*H04N 5/335* (2011.01)
*H04N 5/217* (2011.01)
*H04N 5/32* (2006.01)
*H04N 5/365* (2011.01)
*H04N 5/3745* (2011.01)

(52) U.S. Cl.
CPC .............. *H04N 5/32* (2013.01); *H04N 5/365* (2013.01); *H04N 5/37457* (2013.01)
USPC ......................................... 348/308; 348/241

(58) Field of Classification Search
CPC ...................................................... H04N 5/32
USPC .................. 348/308, 241, 248, 243; 257/292
See application file for complete search history.

(56) References Cited

U.S. PATENT DOCUMENTS

| 4,860,026 | A | 8/1989 | Matsumoto et al. |
|---|---|---|---|
| 5,038,298 | A | 8/1991 | Matsumoto et al. |
| 5,157,773 | A | 10/1992 | Matsumoto et al. |
| 6,046,446 | A | 4/2000 | Kameshima et al. |
| 6,130,965 | A | 10/2000 | Kobayashi et al. |
| 6,633,685 | B1 | 10/2003 | Kusama et al. |
| 6,647,125 | B2 | 11/2003 | Matsumoto et al. |
| 6,704,466 | B1 | 3/2004 | Yamamoto et al. |

(Continued)

FOREIGN PATENT DOCUMENTS

| CN | 1387264 A | 12/2002 |
|---|---|---|
| CN | 1394079 A | 1/2003 |

(Continued)

OTHER PUBLICATIONS

European Search Report dated Mar. 12, 2013, in counterpart European Application No. 11182110.4-1902 /2437485.

(Continued)

*Primary Examiner* — Nhan T Tran
*Assistant Examiner* — Chan Nguyen
(74) *Attorney, Agent, or Firm* — Fitzpatrick, Cella, Harper & Scinto

(57) ABSTRACT

A radiation imaging apparatus includes an imaging unit and an imaging control unit. The imaging control unit causes a switch unit, an accumulation unit, a removal unit, a holding unit, and an addition unit, which constitute a pixel circuit of the imaging unit, to operate at a timing before an imaging operation by the imaging unit so as to fix unstable voltages of the accumulation unit, the removal unit, the holding unit, and the addition unit to a predetermined voltage of a power supply connected via a switch unit.

11 Claims, 8 Drawing Sheets

(56) References Cited

U.S. PATENT DOCUMENTS

| | | |
|---|---|---|
| 6,720,971 B1 | 4/2004 | Yamamoto et al. |
| 6,724,946 B1 | 4/2004 | Kusama et al. |
| 6,731,826 B1 | 5/2004 | Yamamoto et al. |
| 6,739,772 B2 | 5/2004 | Suzuki et al. |
| 6,813,394 B1 | 11/2004 | Matsumoto et al. |
| 6,855,937 B2 | 2/2005 | Tashiro et al. |
| 6,914,227 B2 | 7/2005 | Kaifu et al. |
| 6,927,874 B1 | 8/2005 | Enokida et al. |
| 7,129,500 B2 | 10/2006 | Tashiro et al. |
| 7,646,410 B2 | 1/2010 | Lim |
| 7,809,732 B2 | 10/2010 | Kusama et al. |
| 2002/0190215 A1 | 12/2002 | Tashiro et al. |
| 2003/0010896 A1 | 1/2003 | Kaifu et al. |
| 2005/0018065 A1* | 1/2005 | Tashiro et al. ............... 348/308 |
| 2006/0181627 A1* | 8/2006 | Farrier .......................... 348/308 |
| 2006/0203110 A1* | 9/2006 | Lim .............................. 348/241 |
| 2006/0244854 A1* | 11/2006 | Krymski ....................... 348/308 |
| 2006/0279650 A1* | 12/2006 | Watanabe et al. ............ 348/308 |
| 2009/0324080 A1 | 12/2009 | Yamazaki et al. |
| 2010/0054586 A1 | 3/2010 | Yamazaki |
| 2010/0182465 A1* | 7/2010 | Okita ............................ 348/273 |
| 2011/0080210 A1* | 4/2011 | Kondo .......................... 327/544 |
| 2011/0216231 A1* | 9/2011 | Fowler .......................... 348/294 |
| 2011/0254987 A1* | 10/2011 | Massetti ....................... 348/308 |
| 2012/0092538 A1* | 4/2012 | Kitami et al. ................ 348/302 |

FOREIGN PATENT DOCUMENTS

| | | |
|---|---|---|
| JP | 10-189934 A | 7/1998 |
| JP | 2002-344809 A | 11/2002 |
| JP | 2002-345797 A | 12/2002 |
| JP | 2003-329777 A | 11/2003 |
| JP | 2006-319529 A | 11/2006 |
| JP | 2007-013895 A | 1/2007 |
| JP | 2009-206801 A | 9/2009 |
| KR | 10-2006-0098954 A | 9/2006 |

OTHER PUBLICATIONS

Korean Office Action dated Oct. 6, 2013, issued in counterpart Korean Application No. 10-2011-0098161.

Japanese Office Action dated Feb. 10, 2014, issued in counterpart Japanese Application No. 2010-219766.

Chinese Office Action dated Jan. 30, 2014, issued in counterpart Chinese Application No. 201110303473.5, and English-language translation thereof.

* cited by examiner

F I G. 6
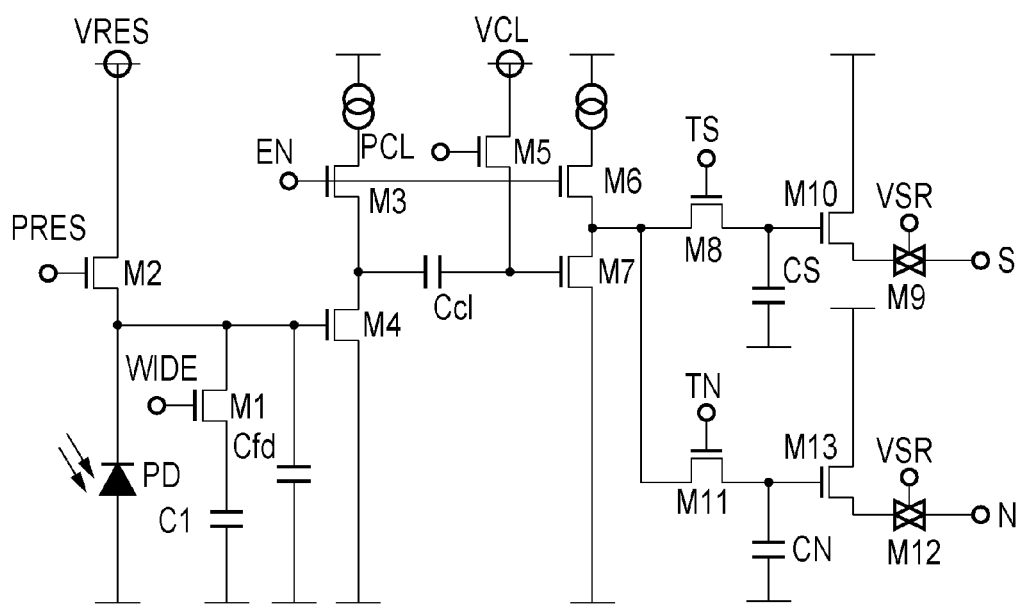

RADIATION IMAGING APPARATUS AND CONTROL METHOD FOR RADIATION IMAGING APPARATUS

BACKGROUND OF THE INVENTION

1. Field of the Invention

The present invention relates to a radiation imaging apparatus and a control method for the radiation imaging apparatus.

2. Description of the Related Art

Recently, in the field of digital radiation imaging apparatuses, instead of an image intensifier, a large-area flat panel sensor based on a 1× optical system using photoelectric conversion elements has been widely used for the purpose of increasing resolution, decreasing volume, and suppressing image distortion. Imaging apparatuses using photoelectric conversion elements include amorphous-silicon-type apparatuses, CCD type apparatuses, and CMOS-type apparatuses. Imaging elements using amorphous silicon semiconductors on a glass substrate allow the apparatus to easily form a large-area imaging apparatus. On the other hand, as compared with a single-crystal silicon semiconductor substrate, amorphous silicon makes it difficult to microfabricate a semiconductor substrate on a glass substrate. As a consequence, the larger the capacitance of an output signal line, the more insufficient the semiconductor characteristics. Although a CCD-type imaging apparatus is of a completely-depleted type and has high sensitivity, the use of this apparatus as a large-area imaging apparatus will lead to an increase in the number of transfer stages for electric charge transfer, resulting in power consumption as much as 10 times that of an apparatus using CMOS-type imaging elements. That is, this technique is not suitable for a large-area imaging apparatus.

Japanese Patent Laid-Open No. 2002-344809 discloses a large-area flat panel type sensor, which implements large-area imaging by using CMOS-type imaging elements as photoelectric conversion elements, and more specifically by tiling rectangular imaging elements which are rectangular CMOS-type photoelectric conversion elements cut out from a silicon semiconductor wafer. A CMOS-type imaging element is capable of fast readout owing to microfabrication as compared with amorphous silicon, and hence allows the apparatus to obtain higher sensitivity. In addition, a CMOS-type imaging element is known as being highly advantageous when implementing a large-area, flat-panel-type sensor. This is because this element is free from the problems of using a number of transfer stages for electric charge transfer and power consumption, unlike a CCD imaging element, and hence facilitates the implementation of large-area imaging.

In addition, Japanese Patent Laid-Open No. 2006-319529 discloses an arrangement using a pixel addition circuit in a CMOS-type imaging element and a sensitivity switch.

Consider a CMOS-type imaging element which implements both pixel addition and sensitivity switching. In this case, when, for example, this element is driven in a high sensitivity mode, the sensitivity switch is turned off, and one end of a dynamic-range expansion capacitor is opened to become a floating capacitor. The electric charge accumulated in this floating capacitor is unstable, and hence unstable voltages are generated in the circuit of the CMOS-type imaging element. When unstable voltages are generated in the circuit of a CMOS-type imaging element in the moving-image capturing operation, a small amount of leakage between the gate and source of each MOS transistor in the circuit of the CMOS-type imaging element becomes unstable, resulting in random noise affecting each frame.

In addition, a CMOS-type imaging element has an offset value, and each pixel outputs a non-zero value as an optical signal even without the application of light. There is available a method of defining optical-signal data acquired without the application of light as a fixed-pattern noise (FPN) pattern of a CMOS-type imaging element and subtracting the FPN pattern from optical-signal data obtained when acquiring a moving image. However, since the electric potential of each floating portion for each moving-image capturing operation changes with time, the electric potential of the floating portion in the CMOS-type imaging element which has acquired an FPN pattern before the imaging operation differs from the electric potential of the floating portion which is set when a moving image is actually acquired. This causes a difference between the FPN pattern and a noise component derived from the unstable voltage of the floating portion in moving image data subjected to FPN correction, resulting in a failure to perform a proper FPN correction.

SUMMARY OF THE INVENTION

The present invention provides a radiation imaging apparatus which can reduce noise components by fixing the unstable voltage of each floating portion in a pixel circuit of a CMOS-type imaging element by electric-potential fixing driving (an electric-potential fixing driving operation) of performing a driving operation of fixing the unstable voltage of each floating portion in the pixel circuit to a predetermined voltage of a power supply at a timing before the imaging operation by an imaging unit.

According to one aspect of the present invention, there is provided a radiation imaging apparatus comprising: an imaging unit formed by arranging pixel circuits in m rows×n columns (where m and n are natural numbers not less than two) in a two-dimensional area, each pixel circuit including a switch unit adapted to be connected to a power supply adapted to apply a predetermined voltage at the time of operation and disconnected from the power supply at the time of non-operation, an accumulation unit adapted to accumulate a signal corresponding to one pixel corresponding to an input radiation signal, a removal unit adapted to remove noise from the signal, a holding unit adapted to hold the signal from which the noise is removed and output the signal, and an addition unit adapted to perform addition processing of the signal held by the holding unit and signals held by a holding units (a being a natural number not less than two) adjacent other pixel circuits; and an imaging control unit adapted to control the operation of each of the pixel circuits constituting the imaging unit, wherein the imaging control unit causes the switch unit, the accumulation unit, the removal unit, the holding unit, and the addition unit, which constitute the pixel circuit, to operate at a timing before imaging operation by the imaging unit so as to fix unstable voltages of the accumulation unit, the removal unit, the holding unit, and the addition unit to the predetermined voltage of the power supply connected via the switch unit.

According to another aspect of the present invention, there is provided a control method for a radiation imaging apparatus including an imaging unit formed by arranging pixel circuits in m rows×n columns (where m and n are natural numbers not less than two) in a two-dimensional area, each including a switch unit adapted to be connected to a power supply adapted to apply a predetermined voltage at the time of operation and disconnected from the power supply at the time of non-operation, an accumulation unit adapted to accumulate a signal corresponding to one pixel corresponding to an input radiation signal, a removal unit adapted to remove noise from the signal, a holding unit adapted to hold the signal from which the noise is removed and output the signal, and an addition unit adapted to perform addition processing of the signal held by the holding unit and signals held by a holding units (a being a natural number not less than two) adjacent other pixel circuits, and an imaging control unit adapted to control the operation of each of the pixel circuits constituting the imaging unit, the method comprising: a step of causing the imaging control unit to cause the switch unit, the accumulation unit, the removal unit, the holding unit, and the addition unit, which constitute the pixel circuit, to operate at a timing before the imaging operation by the imaging unit so as to fix unstable voltages of the accumulation unit, the removal unit, the holding unit, and the addition unit to the predetermined voltage of the power supply connected via the switch unit.

According to the present invention, it is possible to reduce noise components by fixing the unstable voltage of each floating portion in a pixel circuit at a predetermined voltage of a power supply at a timing before the imaging operation by an imaging unit.

Further features of the present invention will become apparent from the following description of exemplary embodiments (with reference to the attached drawings).

BRIEF DESCRIPTION OF THE DRAWINGS

FIG. 6 is a circuit diagram showing an example of the arrangement of a pixel circuit of a CMOS imaging element;

DESCRIPTION OF THE EMBODIMENTS

First Embodiment

Figure 9A:
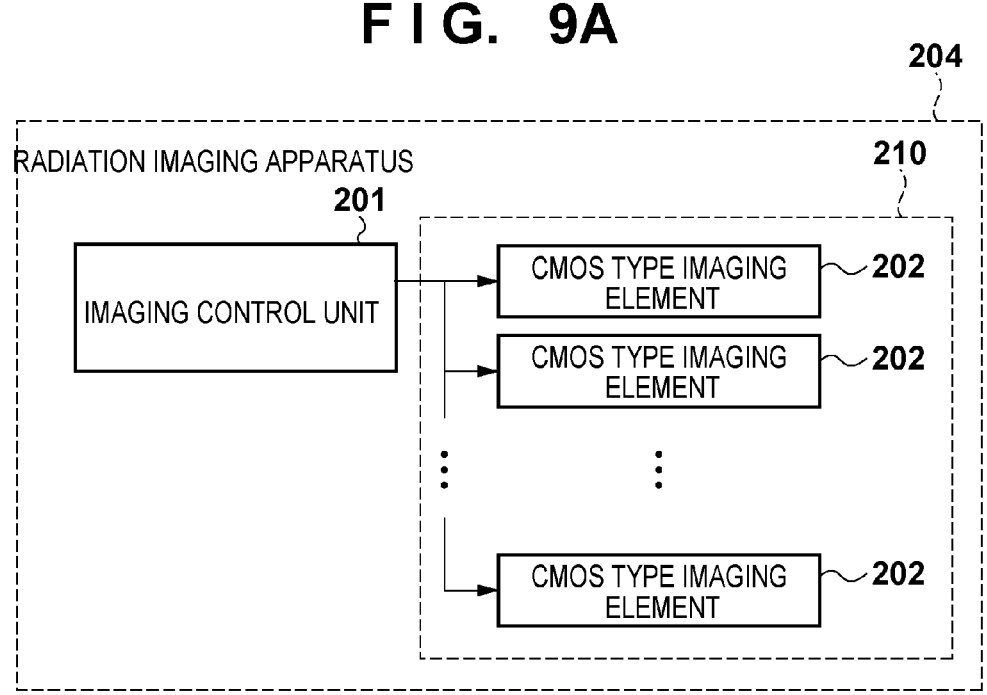
FIG. 9A is a block diagram showing an example of the arrangement of the radiation imaging apparatus according to the first embodiment.
Figure 9B:
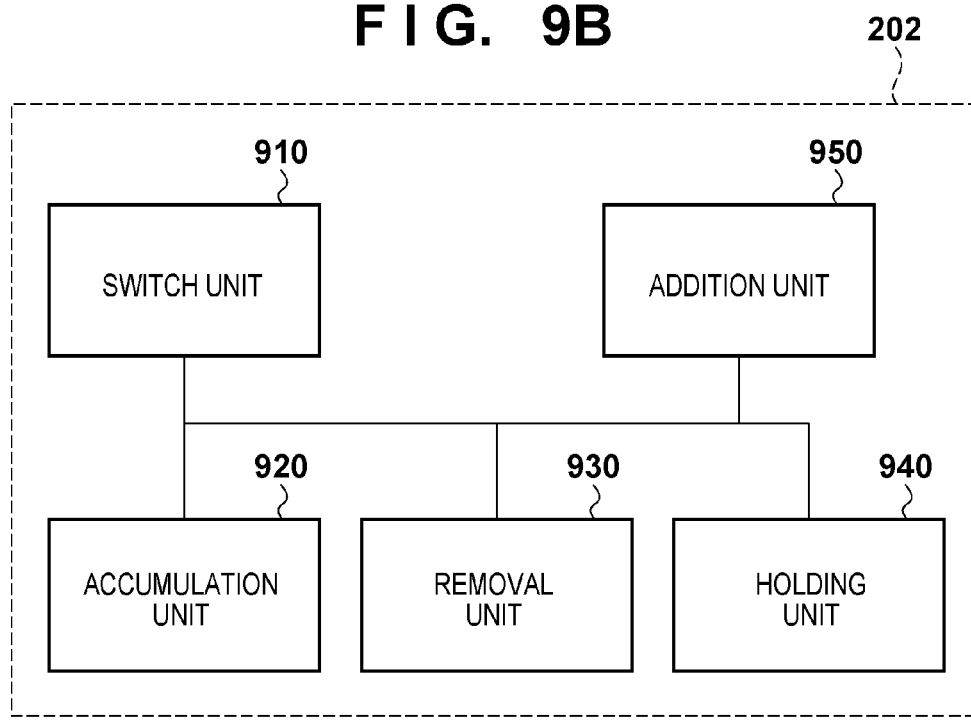
FIG. 9B is a block diagram showing the functional arrangement of a pixel circuit corresponding to one pixel of the CMOS-type imaging element.

FIGS. 9A and 9B show the arrangement of a radiation imaging apparatus 204 according to an embodiment of the present invention. The radiation imaging apparatus 204 shown in FIG. 9A includes an imaging unit 210 constituted by a plurality of CMOS-type imaging elements 202, and an imaging control unit 201 which controls the operation of each of the plurality of CMOS-type imaging elements 202. FIG. 9B shows the functional arrangement of a pixel circuit corresponding to one pixel of a CMOS-type imaging element used for tiling of rectangular imaging elements obtained by cutting out CMOS-type imaging elements in a rectangular shape from a wafer. The imaging unit 210 is constituted by pixel circuits arranged in m rows×n columns (where m and n are natural numbers equal to or more than two). A switch unit 910 of each pixel circuit is connected to a power supply for applying a predetermined voltage at the time of operation, and disconnected from the power supply at the time of non-operation. An accumulation unit 920 accumulates a signal corresponding to one pixel corresponding to an input radiation signal. A removal unit 930 removes noise from the signal accumulated in the accumulation unit 920. A holding unit 940 can hold the signal from which the noise is removed by the removal unit 930, and output the signal. An addition unit 950 performs addition processing for the signal held by the holding unit 940 and the signals held by the a holding units (a is a natural number equal to or more than two) adjacent other pixel circuits. The imaging control unit 201 can control the operation of each of the pixel circuits constituting the imaging unit 210. At a timing before imaging operation by the imaging unit 210, the imaging control unit 201 causes the switch unit 910, the accumulation unit 920, the removal unit 930, holding unit 940, and the addition unit 950, which constitute each pixel circuit, to operate. The imaging control unit 201 sets a predetermined voltage of a power supply connected via the switch unit 910 in the accumulation unit 920, the removal unit 930, the holding unit 940, and the addition unit 950 (electric-potential-fixing-driving operation). Performing an electric-potential-fixing-driving operation at a timing before imaging by the imaging unit 210 can reduce noise components and accurately correct fixed pattern noise by fixing the unstable voltages of the accumulation unit 920, the removal unit 930, the holding unit 940, and the addition unit 950 in the pixel circuit to a predetermined voltage of the power supply. The electric-potential-fixing-driving operation will be described below with reference to a specific circuit arrangement of a CMOS imaging element.

(Example of Circuit Arrangement of CMOS Imaging Element)

FIG. 6 is a circuit diagram showing an example of a pixel circuit corresponding to one pixel of a CMOS-type imaging element used for tiling of rectangular imaging elements obtained by cutting out CMOS-type imaging elements in a rectangular shape from a wafer. Referring to FIG. 6, reference characters PD denotes a photodiode which performs photoelectric conversion; reference characters Cfd denote the capacitance of a floating diffusion region which accumulates electric charge in accordance with an optical signal converted from a radiation signal by the photodiode PD; and reference characters M2 denote a reset MOS transistor (reset switch) for removing the electric charge accumulated in the floating diffusion region. The reset switch M2 is connected to the first power supply for applying a reset voltage VRES as a predetermined voltage at the time of operation, and is disconnected from the first power supply at the time of non-operation.

Reference characters M1 denote a sensitivity switching MOS transistor (sensitivity switch) for switching and setting a high dynamic range mode and a high sensitivity mode; and reference characters C1 denote a dynamic range expansion capacitor which can accumulate electric charge when the sensitivity switch M1 is turned on. The capacitance Cfd of the electric charge accumulation unit (floating diffusion region) increases when the sensitivity switch M1 is turned on. This decreases the sensitivity but expands the dynamic range. For example, when performing a fluoroscopic imaging operation requiring high sensitivity, the sensitivity switch M1 is turned off. When performing a DSA imaging operation which requires a high dynamic range, the sensitivity switch M1 is turned on. Reference characters M4 denote an amplifying MOS transistor (first pixel amplifier) which operates as a source follower; and reference characters M3 denote a selection MOS transistor (selection switch) for activating the first pixel amplifier M4.

The subsequent stage of the first pixel amplifier M4 is provided with a clamp circuit (noise removal circuit) which removes reset noise (kTC noise) generated upon connection to the reset voltage VRES by ON operation of the reset switch M2. Reference characters Ccl denote a clamp capacitor; and reference characters M5 denote a clamp MOS transistor (clamp switch). The clamp switch M5 is connected to the second power supply for applying a clamp voltage VCL as a predetermined voltage at the time of operation, and disconnected from the second power supply at the time of non-operation. Reference characters M7 denote an amplifying MOS transistor (second pixel amplifier) which operates as a source follower; and reference characters M6 denote a selection MOS transistor (selection switch) for activating the second pixel amplifier M7.

The subsequent stage of the second pixel amplifier M7 is provided with two sample and hold circuits. Reference characters M8 denote a sample and hold MOS transistor (sample and hold switch) which forms a sample and hold circuit (first sample and hold circuit) for optical signal accumulation; reference characters CS denote an optical-signal hold capacitor; reference characters M11 denote a sample and hold MOS transistor (sample and hold switch) which forms a noise signal accumulation sample and hold circuit (second sample and hold circuit); reference characters CN denote a noise signal hold capacitor; and reference characters M10 denote an optical signal amplifying MOS transistor (pixel amplifier) which operates as a source follower. The pixel amplifier M10 (third pixel amplifier) outputs the optical-signal voltage held by the optical signal accumulation sample and hold circuit (first sample and hold circuit).

Reference characters M9 denote an analog switch (transfer switch) for outputting the optical signal amplified by the pixel amplifier M10 to the S signal output line; and reference characters M13 denote a noise signal amplifying MOS transistor (pixel amplifier) which operates as a source follower. The pixel amplifier M13 (fourth pixel amplifier) outputs the noise-signal voltage held by the noise signal accumulation sample and hold circuit (second sample and hold circuit). Reference characters M12 denote an analog switch (transfer switch) for outputting the noise signal amplified by the pixel amplifier M13 to the N signal output line.

An EN signal input unit is connected to the gates of the selection switch M3 and selection switch M6. The EN signal input from the EN signal input unit controls the operation states of the first pixel amplifier M4 and second pixel amplifier M7. When the EN signal is set at a high level, the first pixel amplifier M4 and second pixel amplifier M7 are simultaneously activated. When the EN signal is set at a low level, the first pixel amplifier M4 and the second pixel amplifier M7 are simultaneously deactivated. A WIDE signal input unit is connected to the gate of the sensitivity switch M1. The WIDE signal input from the WIDE signal input unit controls sensitivity switching. When the WIDE signal is set at a low level, the sensitivity switch is turned off to set the high sensitivity mode. When the WIDE signal is set at a high level, the sensitivity switch is turned on to set the low sensitivity mode. A PRES signal is a reset signal for turning on the reset switch M2 to discharge the electric charge accumulated in the floating diffusion capacitor Cfd. A PCL signal is a signal for controlling the clamp switch M5. When the PCL signal is set at a high level, the clamp switch M5 is turned on to set the clamp capacitor Ccl at the clamp voltage VCL as a reference voltage. A TS signal is an optical signal sample and hold control signal. Setting the TS signal at a high level to turn on the sample and hold switch M8 will collectively transfer the optical signal to the capacitor CS via the second pixel amplifier M7.

Subsequently, setting the TS signal at a low level at once for all the pixels to turn off the sample switch M8 will stop holding the optical-signal charge in the sample and hold circuit. A TN signal is a noise signal sample and hold control signal. Setting the TN signal at the high level to turn on the sample and hold switch M11 will collectively transfer the noise signal to the capacitor CN via the second pixel amplifier M7. Setting the TN signal at a low level at once for all the pixels to turn off the sample and hold switch M11 will stop holding noise signal charge in the sample and hold circuit.

(Example of Driving Operation of CMOS Imaging Element)

Figure 7:
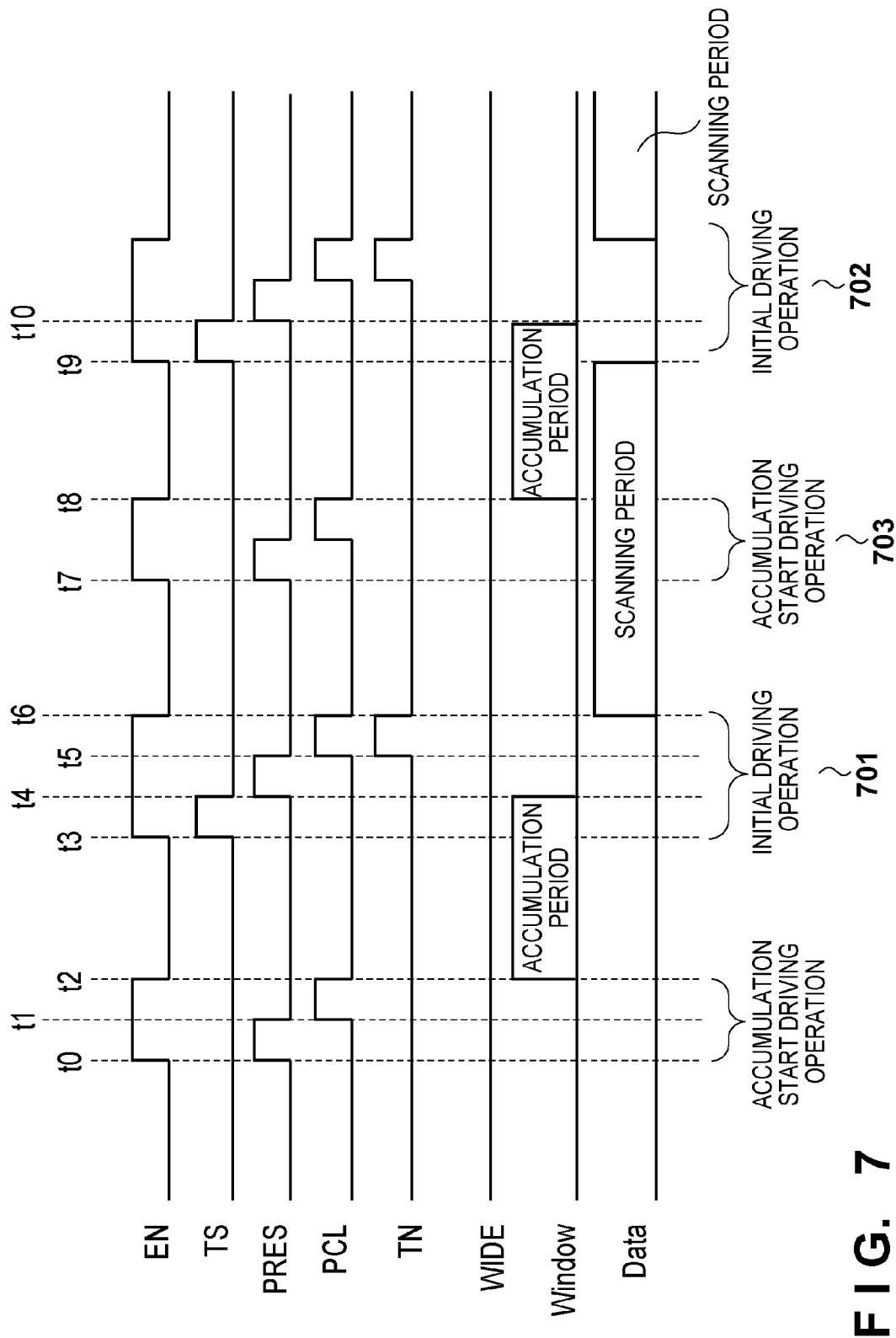
FIG. 7 is a timing chart of the driving timing of a pixel circuit of the CMOS imaging element.

FIG. 7 is a timing chart exemplifying the driving timing in the moving-image capturing operation when the pixel circuit in FIG. 6 does not execute the electric-potential-fixing-driving operation. The rising and falling timings of control signals until electric charge is sampled and held in the optical signal hold capacitor CS and the noise signal hold capacitor CN in the moving-image capturing operation will be described with reference to FIG. 7.

At time t0, the accumulation-start-driving operation starts. The accumulation-start-driving operation is the driving operation of performing resetting and clamping. First of all, at time t0, this apparatus changes the EN signal from the low level to the high level to activate the first pixel amplifier M4 and the second pixel amplifier M7. The apparatus then changes the PRES signal from the low level to the high level to connect the photodiode PD to the reset voltage VRES to perform resetting. The apparatus changes the PRES signal from the high level to the low level to stop resetting, thereby setting the reset voltage VRES on the first pixel amplifier M4 side of the clamp capacitor Ccl.

At time t1, the apparatus changes the PCL signal from the low level to the high level to turn on the clamp switch M5 to set the clamp voltage VCL on the second pixel amplifier M7 side of the clamp capacitor Ccl. At time t2, the apparatus changes the PCL signal from the high level to the low level to turn off the clamp switch M5. Electric charge corresponding to the voltage difference between the clamp voltage VCL and the reset voltage VRES is accumulated in the clamp capacitor Ccl to stop clamping. At time t2, the accumulation-start-driving operation ends.

When the accumulation-start-driving operation ends, the floating diffusion capacitor Cfd of the photoelectric conversion unit starts accumulation from time t2. The tiled CMOS-type imaging elements are configured to collectively perform the accumulation-start-driving operation of all the pixels of the respective imaging elements at the same timing in the same period so as to prevent image misregistration caused by temporal switching offsets between imaging elements and scanning lines at the time of the moving-image capturing operation. Thereafter, the photocharge generated by the photodiode PD is collectively accumulated in the floating diffusion capacitor Cfd. In the accumulation-start-driving operation from time t0 to time t2, when the reset switch M2 is turned on and connected to the reset voltage VRES, reset noise (kTC noise) is generated. The apparatus removes this reset noise (kTC noise) by fixing the second pixel amplifier M7 side of the clamp capacitor Ccl of the clamp circuit to the clamp voltage VCL.

At time t3, the initial driving operation starts. The apparatus changes the EN signal from the low level to the high level to turn on the selection switch M3 and the selection switch M6. This converts the electric charge accumulated in the floating diffusion capacitor Cfd into a voltage and outputs the converted voltage from the first pixel amplifier M4, which operates as a source follower, to the clamp capacitor Ccl. The voltage output from the first pixel amplifier M4 includes reset noise. Since the second pixel amplifier M7 side is set to the clamp voltage VCL at the time of resetting by the clamp circuit, the voltage including the reset noise is output, as an optical-signal voltage from which the reset noise is removed, to the second pixel amplifier M7. The apparatus then sets the sample and hold control signal TS to the high level to turn on the sample and hold switch M8, thereby collectively transferring the optical-signal voltage to the optical signal hold capacitor CS via the second pixel amplifier M7.

At time t4, the apparatus changes the TS signal from the high level to the low level to turn off the sample and hold switch M8, thereby sampling and holding electric charge (optical-signal charge) corresponding to the optical-signal voltage in the optical signal hold capacitor CS.

At time t4, the apparatus changes the reset signal PRES from the low level to the high level to turn on the reset switch M2 so as to reset the floating diffusion capacitor Cfd to an electric potential corresponding to the reset voltage VRES. At time t5, the apparatus changes the reset signal PRES from the high level to the low level to complete resetting. At this time, the reset voltage VRES is set on the first pixel amplifier M4 side of the clamp capacitor Ccl.

At time t5, the apparatus changes the PCL signal from the low level to the high level. This turns on the clamp switch M5 to set the clamp voltage VCL on the second pixel amplifier M7 side of the clamp capacitor Ccl. The apparatus accumulates electric charge corresponding to the voltage difference between the clamp voltage VCL and the reset voltage VRES in the clamp capacitor Ccl.

At time t5, the apparatus changes the TN signal from the low level to the high level to turn on the sample and hold switch M11. This transfers the noise-signal voltage generated when the clamp voltage VCL is set to the noise signal hold capacitor CN.

At time t6, the apparatus changes the TN signal from the high level to the low level to turn off the sample and hold switch M11. This causes the noise signal hold capacitor CN to sample and hold electric charge (noise signal charge) corresponding to the noise-signal voltage. At time t6, the apparatus changes the EN signal and the PCL signal from the high level to the low level to finish the initial driving operation. The apparatus collectively performs the initial driving operation for all the pixels.

After the initial driving operation, the apparatus performs the accumulation-start-driving operation again at time t7 to make the photodiode PD start accumulating a frame ((N+1)th frame) next to the current frame (Nth frame (N: natural number)). Optical-signal and noise-signal scanning is performed for each pixel. Turning on the transfer switch M9 and the transfer switch M12 will output an optical-signal voltage corresponding to the electric charge in the optical signal hold capacitor CS and a noise-signal voltage corresponding to the electric charge in the noise signal hold capacitor CN. The optical-signal voltage corresponding to the electric charge in the optical signal hold capacitor CS is transferred to the optical signal output line via the pixel amplifier M10. The noise-signal voltage corresponding to the electric charge in the noise signal hold capacitor CN is transferred to the noise signal output line via the pixel amplifier M13.

A differential input amplifier (not shown) connected to an optical signal output line and a noise signal output line subtracts an optical-signal voltage transferred to the optical signal output line and a noise-signal voltage transferred to the noise signal output line from each other to obtain the difference between them. A noise-signal voltage corresponds to, for example, thermal noise generated by a pixel amplifier, 1/f noise, a temperature difference, or fixed pattern noise (FPN) due to process variations. Subtraction processing in the differential input amplifier removes fixed pattern noise (FPN) from the optical-signal voltage. The period during which a noise-signal voltage and an optical-signal voltage associated with the current frame can be transferred is the interval from the sample and hold end time t6 and the time t9 when the optical-signal charge associated with the next frame is sampled and held.

In the circuit in FIG. 6, the accumulation start timing of the floating diffusion capacitor Cfd is time t2 or time t8 in FIG. 7, at which the PCL signal is set to a low level to complete clamping. The accumulation end timing is time t4 or time t10, at which the TS signal is changed from the high level to the low level to sample and hold an optical-signal voltage. It is possible to limit the accumulation time by inserting the accumulation-start-driving operation or the initial driving operation for an accumulation time start between initial driving operation 701 and the initial driving operation 702 for sampling and holding an optical-signal voltage and a noise-signal voltage. In the case shown in FIG. 7, the apparatus inserts the accumulation-start-driving operation 703 at time t7. Although the period of sampling and holding an optical-signal-voltage ranges from time t4 to time t10, the apparatus limits the accumulation time to the time interval from time t8 to time t10, which is equal to the time interval from time t2 to time t4.

Each pixel circuit includes the first addition circuit for connecting an optical signal accumulation sample and hold circuit (first sample and hold circuit) to the optical signal accumulation sample and hold circuit (third sample and hold circuit) of other pixel circuit to add optical-signal voltages. The pixel circuit includes the second addition circuit for connecting a noise signal sample and hold circuit (second sample and hold circuit) to the noise signal sample and hold circuit (fourth sample and hold circuit) of other pixel circuit to add noise-signal voltages.

Figure 8A:
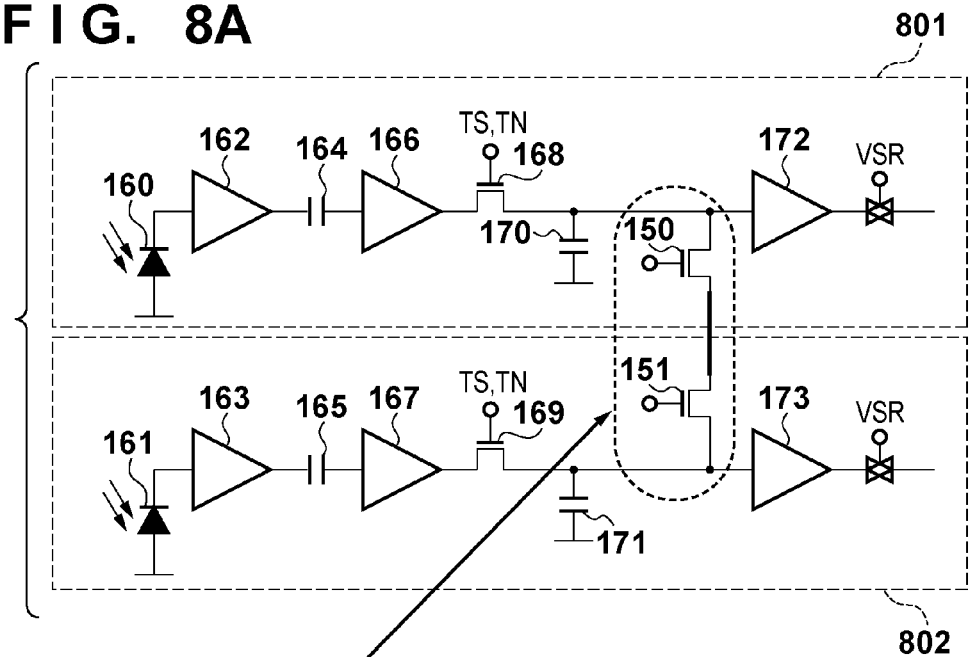
FIG. 8A is a circuit diagram showing an example of the arrangement of addition circuits in pixel circuits of the CMOS-type imaging element.

FIG. 8A is a circuit diagram showing an example of the arrangement of the addition circuits (first and second addition circuits) in pixel circuits of a CMOS-type imaging element. FIG. 8A shows an example of a circuit arrangement in which addition circuits (first and second addition circuits) are inserted in a circuit arrangement indicating pixel circuits 801 and 802 corresponding to two circuits in a simplified form. Each of photodiodes 160 and 161 corresponds to the photodiode PD in FIG. 6. Reference numerals 162, 163, 166, 167, 172, and 173 each denote an amplifying MOS transistor (pixel amplifier) which operates as a source follower in each circuit. Each of the pixel amplifiers 162 and 163 corresponds to the first pixel amplifier M4 in FIG. 6. Each of the pixel amplifiers 166 and 167 corresponds to the second pixel amplifier M7 in FIG. 6. The pixel amplifiers 172 and 173 correspond to the pixel amplifier M10 (third pixel amplifier) and the pixel amplifier M13 (fourth pixel amplifier) in FIG. 6. Reference numerals 164 and 165 denote clamp capacitors of the respective pixel circuits, and each corresponds to the clamp capacitor Ccl in FIG. 6. Reference numerals 168 and 169 each denotes a sample MOS transistor (sample and hold switch) as a component of a sample and hold circuit for accumulating an optical-signal voltage or a noise-signal voltage in a corresponding pixel circuit. Each of the sample and hold switches 168 and 169 correspond to the sample and hold switch M8 or the sample and hold switch M11 in FIG. 6. Reference numerals 170 and 171 each denote an optical signal hold capacitor or a noise signal hold capacitor, which corresponds to the optical signal hold capacitor CS or the noise signal hold capacitor CN in FIG. 6. An addition circuit 150 connects an optical signal hold capacitor (noise signal hold capacitor) in the pixel circuit 801 to an addition circuit 151. The addition circuit 151 connects an optical signal hold capacitor (noise signal hold capacitor) in the pixel circuit 802 to the addition circuit 150. For simple illustration, FIG. 8A shows each of the addition circuits 150 and 151 as a circuit element. The apparatus arrangement actually includes circuit elements corresponding to the first addition circuit for adding optical-signal voltages and the second addition circuit for adding noise-signal voltages.

Figure 8B:
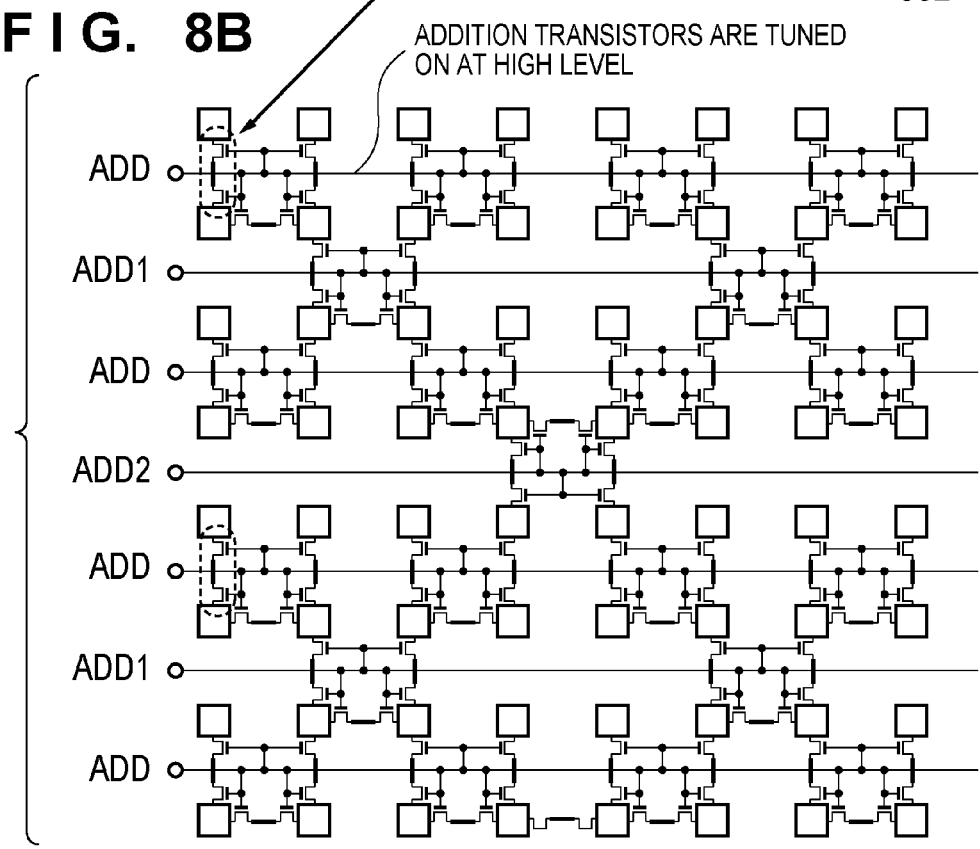
FIG. 8B is a view showing the schematic arrangement of CMOS-type imaging elements connected via addition circuits.

FIG. 8B is a view showing the schematic arrangement of CMOS-type imaging elements connected via addition circuits (first and second addition circuits). Each pixel circuit shown in FIG. 6 is indicated by the rectangle "□". The portions enclosed by the dotted lines in FIGS. 8A and 8B indicate identical circuit portions.

As shown in FIG. 8B, optical signal hold capacitors or noise signal hold capacitors of adjacent pixels are connected to each other to perform pixel addition. This makes it possible to read signals at a higher frame rate by reducing the number of pixels to be scanned without discarding pixel information. Changing an addition signal from the Low level (low level) to the High level (high level) will activate (turn ON) all the addition MOS transistors connected to the addition signal line. Referring to FIG. 8B, setting the ADD signal at the high level and the ADD1 signal at the low level can perform pixel addition for 2×2 pixels. Setting the ADD signal at the high level and the ADD1 signal at the high level can perform pixel addition for 4×4 pixels. In addition, the ADD signal, ADD1 signal, and ADD2 signal at the high level can perform pixel addition for 8×8 pixels.

(Driving Control of CMOS Imaging Element)

Figure 1:
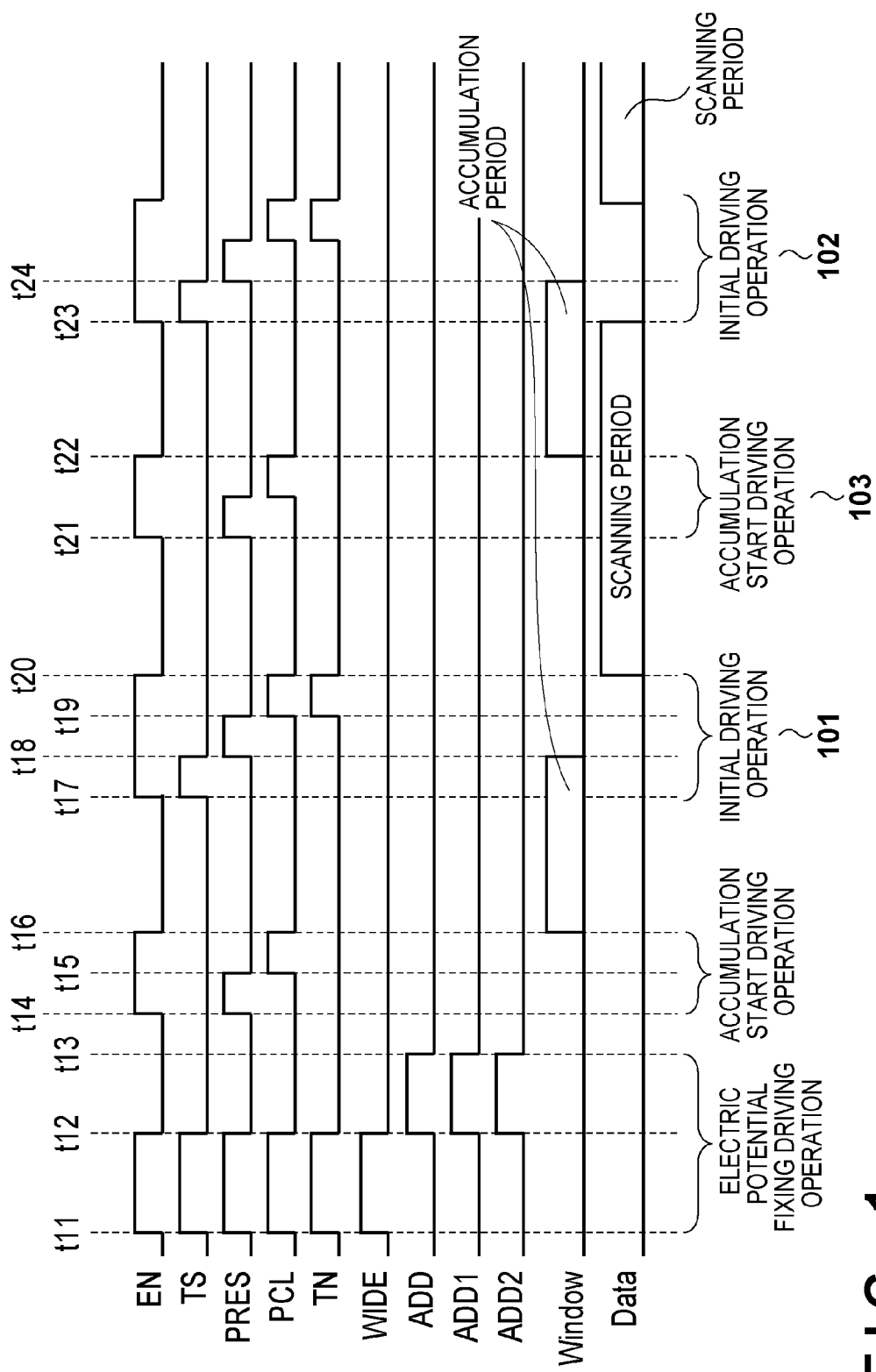
FIG. 1 is a timing chart showing the driving timing of a pixel circuit in the first embodiment.

Driving control of a CMOS imaging element which performs the electric-potential-fixing-driving operation as a characteristic feature of the present invention will be described with reference to the timing chart of FIG. 1. FIG. 1 is a timing chart of driving waveforms when performing the moving-image capturing operation from the first frame to the second frame in a pixel circuit corresponding to one pixel of the CMOS-type imaging element shown in FIGS. 6, 8A, and 8B. Assume that pixel circuit settings are set to a high sensitivity, perform no pixel addition, and collectively perform the driving operation shown in FIG. 1 for all the pixels in the CMOS-type imaging element.

The timing chart of FIG. 1 will be described in chronological order. This embodiment performs the driving operation of fixing unstable voltages to a predetermined voltage of a power supply at a timing before the imaging operation by the imaging unit in order to fix the unstable voltage of each floating portion in a pixel circuit of a CMOS-type imaging element (electric-potential-fixing-driving operation). First of all, at time t11, the apparatus changes the EN signal, the TS signal, the PRES signal, the PCL signal, the TN signal, and the WIDE signal from the low level to the high level. This turns on the reset switch M2, clamp switch M5, the sample and hold switch M8, the sample and hold switch M11, the sensitivity switch M1, the selection switch M3, and the selection switch M6. Referring to FIG. 6, a stable electric potential is applied to each floating portion between the transfer switch M9 on the input side of the pixel circuit and the transfer switch M12 on the output side. After fixing all the floating portions in the pixel circuit to a stable electric potential, the apparatus changes the EN signal, the TS signal, the PRES signal, the PCL signal, the TN signal, and the WIDE signal from the high level to the low level at time t12. This turns off the reset switch M2, the clamp switch M5, the sample and hold switch M8, the sample and hold switch M11, the sensitivity switch M1, the selection switch M3, and the selection switch M6. With this operation, referring to FIG. 6, all the floating portions between the transfer switch M9 on the input side of the pixel circuit and the transfer switch M12 on the output side are fixed (clamped) to a stable electric potential.

At time t12, the apparatus changes ADD, ADD1, and ADD2 from the low level to the high level to turn on the addition circuit 150 and the addition circuit 151 (FIG. 8B). This sets a stable electric potential in all the floating portions in the pixel circuit shown in FIG. 8B. In order to fix all the floating portions in the pixel circuit shown in FIG. 8B to a stable electric potential, the apparatus changes ADD, ADD1, and ADD2 from the high level to the low level at time t13. This fixes the floating portions of the pixel circuit shown in FIG. 8B to a stable electric potential. All the floating portions in the pixel circuits in the CMOS-type imaging element are set to the fixed electric potential. The electric-potential-fixing-driving operation is executed from time t11 to time t12 in FIG. 1.

The apparatus then performs the accumulation-start-driving operation. The accumulation-start-driving operation is the driving operation of performing resetting and clamping from time t14 to time t16 in FIG. 1. First of all, at time t14, the apparatus changes the EN signal from the low level to the high level to activate the first pixel amplifier M4 and the second pixel amplifier M7. The apparatus then changes the reset signal (PRES signal) from the low level to the high level to turn on the reset switch. The floating diffusion capacitor Cfd is reset by being connected to the reset voltage VRES. At time t15, the apparatus changes the PRES signal from the high level to the low level to stop resetting. This sets the reset voltage VRES on the first pixel amplifier M4 side of the clamp capacitor Ccl.

At time t15, the apparatus changes the PCL signal from the low level to the high level to turn on the clamp switch M5. This sets the clamp voltage VCL on the second pixel amplifier M7 side of the clamp capacitor Ccl.

At time t16, the apparatus changes the PCL signal from the high level to the low level to turn off the clamp switch M5 to accumulate electric charge corresponding to the voltage difference between the clamp voltage VCL and the reset voltage VRES in the clamp capacitor Ccl, thus completing the clamping operation. The accumulation-start-driving operation ends at time t16.

The apparatus starts accumulation in the floating diffusion capacitor Cfd from time t16. The tiled CMOS-type imaging elements are configured to collectively perform the accumulation-start-driving operation of all the pixels of the respective imaging elements at the same timing in the same period so as to prevent image misregistration caused by temporal switching offsets between imaging elements and scanning lines at the time of the moving-image capturing operation. Thereafter, the photocharge generated by the photodiode PD is collectively accumulated in the floating diffusion capacitor Cfd. In the accumulation-start-driving operation from time t14 to time t16, when the reset switch M2 is turned on and connected to the reset voltage VRES, reset noise (kTC noise) is generated. The apparatus removes this reset noise (kTC noise) by fixing the second pixel amplifier M7 side of the clamp capacitor Ccl of the clamp circuit to the clamp voltage VCL.

The initial driving operation, which starts at time t17, will be described. The apparatus changes the EN signal from the low level to the high level to turn on the selection switch M3 and the selection switch M6. This converts the electric charge accumulated in the floating diffusion capacitor Cfd into a voltage and outputs the converted voltage from the first pixel amplifier M4, which operates as a source follower, to the clamp capacitor Ccl. The voltage output from the first pixel amplifier M4 includes reset noise. Since the second pixel amplifier M7 side is fixed to the clamp voltage VCL, the reset noise is removed. The optical-signal voltage, from which the reset noise is removed, is output to the second pixel amplifier M7.

At time t17, the apparatus then changes the sample and hold control signal TS from the low level to the high level to turn on the sample and hold switch M8, thereby collectively transferring the optical-signal voltage to the optical signal hold capacitor CS via the second pixel amplifier M7.

At time t18, the apparatus changes the TS signal from the high level to the low level to turn off the sample and hold switch M8. This causes the optical signal hold capacitor CS to sample and hold the optical-signal charge corresponding to the optical-signal voltage.

At time t18, the apparatus changes the reset signal PRES from the low level to the high level to turn on the reset switch M2. This resets the floating diffusion capacitor Cfd with electric charge corresponding to the reset voltage VRES. At time t19, the apparatus changes the reset signal PRES from the high level to the low level to complete the resetting operation. This sets the reset voltage VRES on the first pixel amplifier M4 side of the clamp capacitor Ccl.

At time t19, the apparatus changes the PCL signal from the low level to the high level. This turns on the clamp switch M5 to set the clamp voltage VCL on the second pixel amplifier M7 side of the clamp capacitor Ccl. The clamp capacitor Ccl then accumulates electric charge corresponding to the voltage difference between the clamp voltage VCL and the reset voltage VRES.

At time t19, the apparatus changes the TN signal from the low level to the high level to turn on the sample and hold switch M11 to transfer the noise-signal voltage generated when the capacitor is set to the clamp voltage VCL onto the noise signal hold capacitor CN.

At time t20, the apparatus changes the TN signal from the high level to the low level to turn off the sample and hold switch M11. This causes the noise signal hold capacitor CN to sample and hold noise signal charge corresponding to the noise-signal voltage. At time t20, the apparatus changes the EN signal and the PCL signal from the high level to the low level to complete the initial driving operation. The apparatus collectively performs the initial driving operation for all the pixels.

After the initial driving operation, the apparatus performs the accumulation-start-driving operation again at time t21 to cause the floating diffusion capacitor Cfd to start accumulation in a frame ((N+1)th frame) next to the current frame (Nth frame (N: natural number)). The apparatus performs optical-signal and noise-signal scanning for each pixel. Turning on the transfer switch M9 and the transfer switch M12 causes the optical signal hold capacitor CS and the noise signal hold capacitor CN to respectively output an optical-signal voltage and a noise-signal voltage. That is, the optical-signal voltage from the optical signal hold capacitor CS is transferred to the optical signal output line via the pixel amplifier M10 (third pixel amplifier). The noise-signal voltage from the noise signal hold capacitor CN is transferred to the noise signal output line via the pixel amplifier M13 (fourth pixel amplifier).

A differential input amplifier (not shown) connected to the optical signal output line and the noise signal output line subtracts the noise-signal voltage transferred to the noise signal output line and the optical-signal voltage transferred to the optical signal output line from each other to obtain the difference between them. A noise-signal voltage corresponds to, for example, thermal noise generated by a pixel amplifier, 1/f noise, a temperature difference, or fixed pattern noise (FPN) due to process variations. The subtraction processing performed by the differential input amplifier removes fixed pattern noise (FPN) from the optical-signal voltage.

The period during which a noise-signal voltage and optical-signal voltage associated with the current frame can be transferred is the interval from the sample and hold end time t20 and the time t23 when the optical-signal charge associated with the next frame is sampled and held again.

The optical signal obtained by the subtraction processing by the differential input amplifier further undergoes FPN correction with an FPN pattern of an optical signal acquired in advance under the condition without the application of light.

In the driving operation in FIG. 1, since high sensitivity is set and no pixel addition is performed, the apparatus does not turn on the sensitivity switch M1, addition circuit 150, and addition circuit 151 after the accumulation-start-driving operation, and the floating portions between the capacitor C1, the addition circuit 150, and the addition circuit 151 remain unchanged. However, the apparatus fixes the electric potentials between the capacitor C1, the addition circuit 150, and the addition circuit 151 to those before the moving-image capturing operation to fix part of random noise generated in the background of a captured image by unstable voltages in the circuit. Fixing part of random noise allows the apparatus to perform accurate FPN correction because there is no difference between the electric potentials of the floating portions in the CMOS-type imaging element circuit at the time of acquisition of the FPN pattern and the electric potentials of the floating portions when a moving image is actually acquired.

In the circuit in FIG. 6, the accumulation start timing of the floating diffusion capacitor Cfd is time t16 or t22 in FIG. 1, at which the apparatus sets the PCL signal to the low level to complete clamping. The accumulation end timing is time t18 or time t24, at which the apparatus sets the TS signal to the low level to sample and hold an optical signal. It is possible to limit an accumulation time by inserting the accumulation-start-driving operation or initial driving operation for an accumulation time start between initial driving operation 101 and initial driving operation 102 for sampling and holding an optical signal and a noise signal.

In the case shown in FIG. 1, the apparatus inserts the accumulation-start-driving operation 103 at time t21. Although the period of sampling and holding an optical signal ranges from time t18 to time t24, the apparatus limits the accumulation time to the time interval from time t22 to time t24, which is equal to the time interval from time t16 to time t18. When inserting the initial driving operation at time t21, the apparatus limits the scanning period to the interval from time t20 to time t21 before the time when the apparatus starts the initial driving operation and samples and holds the optical-signal charge. If a required accumulation time coincides with a sample period, the apparatus starts the initial driving operation from time t21 without inserting the accumulation-start-driving operation between time t21 and time t22.

(Low Sensitivity Mode without Pixel Addition)

An operation mode of a pixel circuit (low sensitivity mode (high dynamic range mode)) in which a low sensitivity is set in the pixel circuit and the dynamic range is expanded will be described next. Assume that no pixel addition is performed. Since the apparatus operates at the same driving timings as those in the timing chart shown in FIG. 1 except for the timing of the WIDE signal, the differences from FIG. 1 will be described with reference to FIGS. 1 and 6. At time t14, the apparatus changes the WIDE signal from the low level to the high level to turn on the sensitivity switch M1. This connects the floating diffusion capacitor Cfd in parallel with the capacitor C1 to increase the capacitance of the floating node portion, resulting in expansion of the dynamic range at the sacrifice of a decrease in sensitivity. After the WIDE signal changes from the low level to the high level at time t14 in FIG. 1, the signal is kept at the high level until the end of imaging operation. This expands the dynamic range with the sacrifice of a decrease in sensitivity during imaging operation. When the sensitivity decreases, a floating portion is formed between the addition circuit 150 and the addition circuit 151. However, it is possible to reduce noise components by fixing the unstable voltages of the floating portions in the pixel circuit to a predetermined voltage of the power supply at a timing before imaging operation by the imaging unit.

(High Sensitivity Mode with Pixel Addition)

An example of pixel addition will be described by exemplifying pixel addition of 2×2 pixels. Assume that the high sensitivity mode is set. In an example of pixel addition of 2×2 pixels, the apparatus operates in the same manner as that indicated by the timing chart shown in FIG. 1 except for the ADD signal, and hence the differences from FIG. 1 will be described with reference to FIGS. 1, 6, 8A, and 8B. At time t20, the imaging control unit 201 changes the TN signal from the high level to the low level to turn on the sample and hold switch M11, thus completing accumulation of a noise signal component in the noise signal hold capacitor CN. Thereafter, the imaging control unit 201 sets the ADD signal to the high level to turn on the addition circuit 150 and the addition circuit 151. At this time, the imaging control unit 201 turns on all the MOS transistors connected to the ADD signal line in FIG. 8B. With this operation, at time t18, the imaging control unit 201 performs pixel addition of 2×2 pixels for both the optical signal completely accumulated in the optical signal hold capacitor CS and a noise signal completely accumulated in the noise signal hold capacitor CN. The imaging control unit 201 changes the ADD signal from the high level to the low level at time t23. In a scanning period for an optical signal and noise signal, adjacent 2×2 pixels are subjected to pixel addition.

When performing pixel addition of 2×2 pixels in the high sensitivity mode in accordance with the timing chart of FIG. 7, the capacitor C1, and an addition circuit used for pixel addition of 4×4 pixels and pixel addition of 8×8 pixels in FIG. 8B become a floating portion. However, it is possible to reduce noise components by fixing the unstable voltages of the floating portions in the pixel circuit by performing the electric-potential-fixing-driving operation before the moving-image capturing operation in accordance with the timing chart of FIG. 1.

Likewise, when performing pixel addition of 4×4 pixels, the imaging control unit 201 changes the ADD signal and ADD1 signal from the low level to the high level at time t20 to turn on all the MOS transistors connected to the ADD signal line and ADD1 signal line. With this operation, the imaging control unit 201 performs pixel addition of 4×4 pixels for both the optical signal completely accumulated in the optical signal hold capacitor CS and the noise signal completely accumulated at time t18 in the noise signal hold capacitor CN. The imaging control unit 201 changes the ADD signal and ADD1 signal from the high level to the low level at time t23. When performing pixel addition of 4×4 pixels in the high sensitivity mode in accordance with the timing chart of FIG. 7, the capacitor C1 and the pixel addition circuits for 8×8 pixels in FIG. 8B become floating portions. However, it is possible to reduce noise components by fixing the unstable voltages of the floating portions in the pixel circuit by performing the electric-potential-fixing-driving operation before the moving-image capturing operation in accordance with the timing chart of FIG. 1.

Likewise, when performing pixel addition of 8×8 pixels, the imaging control unit 201 changes the ADD signal, the ADD1 signal, and the ADD2 signal from the low level to the high level at time t20 to turn on all the MOS transistors connected to the ADD signal line, the ADD1 signal line, and the ADD2 signal. With this operation, the imaging control unit 201 performs pixel addition of 8×8 pixels for both the optical signal completely accumulated in the optical signal hold capacitor CS and the noise signal completely accumulated in the noise signal hold capacitor CN at time t18. The imaging control unit 201 changes the ADD signal, ADD1 signal and AND2 signal from the high level to the low level at time t23. When performing pixel addition of 8×8 pixels in the high sensitivity mode in accordance with the timing chart of FIG. 7, the capacitor C1 becomes a floating portion. However, it is possible to reduce noise components by fixing the unstable voltage of the floating portion in the pixel circuit by performing the electric-potential-fixing-driving operation before the moving-image capturing operation in accordance with the timing chart of FIG. 1. In addition, this makes it possible to accurately perform FPN correction.

In the high sensitivity mode, the capacitor C1 becomes a floating portion. When decreasing the sensitivity, the imaging control unit 201 changes the WIDE signal from the low level to the high level to turn on the sensitivity switch M1. This connects the floating diffusion capacitor Cfd in parallel with the capacitor C1 to increase the capacitance of the floating node portion, resulting in expansion of the dynamic range with the sacrifice of a decrease in sensitivity. When decreasing the sensitivity and performing pixel addition of 2×2, 4×4, and 8×8 pixels, the capacitor C1 does not become a floating portion.

When decreasing the sensitivity and performing pixel addition of 2×2 pixels, each addition circuit used for pixel addition of 4×4 pixels and pixel addition of 8×8 pixels becomes a floating portion. When decreasing the sensitivity and performing pixel addition of 4×4 pixels, each addition circuit used for pixel addition of 8×8 pixels becomes a floating portion. In these cases as well, it is possible to reduce noise components by fixing the unstable voltage of the floating portion in the pixel circuit by performing the electric-potential-fixing-driving operation (FIG. 1) before the moving-image capturing operation. In addition, this makes it possible to accurately perform FPN correction.

Note that in the electric-potential-fixing-driving operation, the apparatus changes the EN signal, the TS signal, the PRES signal, the PCL signal, the TN signal, the WIDE signal, the ADD signal, the ADD1 signal, and the ADD2 signal from the low level to the high level. It is possible to change the timings at which the apparatus changes the respective signals from the low level to the high level and from the high level to the low level as long as it is possible to achieve the object of setting all the floating portions at a stable electric potential. For example, the apparatus may change the timings of setting the EN signal, the TS signal, the PRES signal, the PCL signal, and the TN signal to the low level and to the high level so as to implement the same driving pattern as in initial driving operation. It is also possible to repeatedly changing one signal from the high level to the low level.

Although the accumulation-start-driving operation and the initial driving operation shown in FIG. 1 indicate different driving patterns, the present invention is not limited to this example. For example, it is possible to perform the accumulation-start-driving operation according to a driving pattern similar to that for the initial driving operation. This makes it possible for the apparatus to implement only one driving pattern. This leads to simplification of implementation. In addition, the apparatus need not perform the accumulation-start-driving operation from time t21 and the initial driving operation from time t23. This makes it possible to capture only an image of one frame.

According to this embodiment, it is possible to reduce noise components and accurately correct fixed pattern noise by fixing the unstable voltage of the floating portion in the pixel circuit to a predetermined voltage of the power supply at a timing before the moving-image capturing operation by the imaging unit.

Second Embodiment

Figure 2:
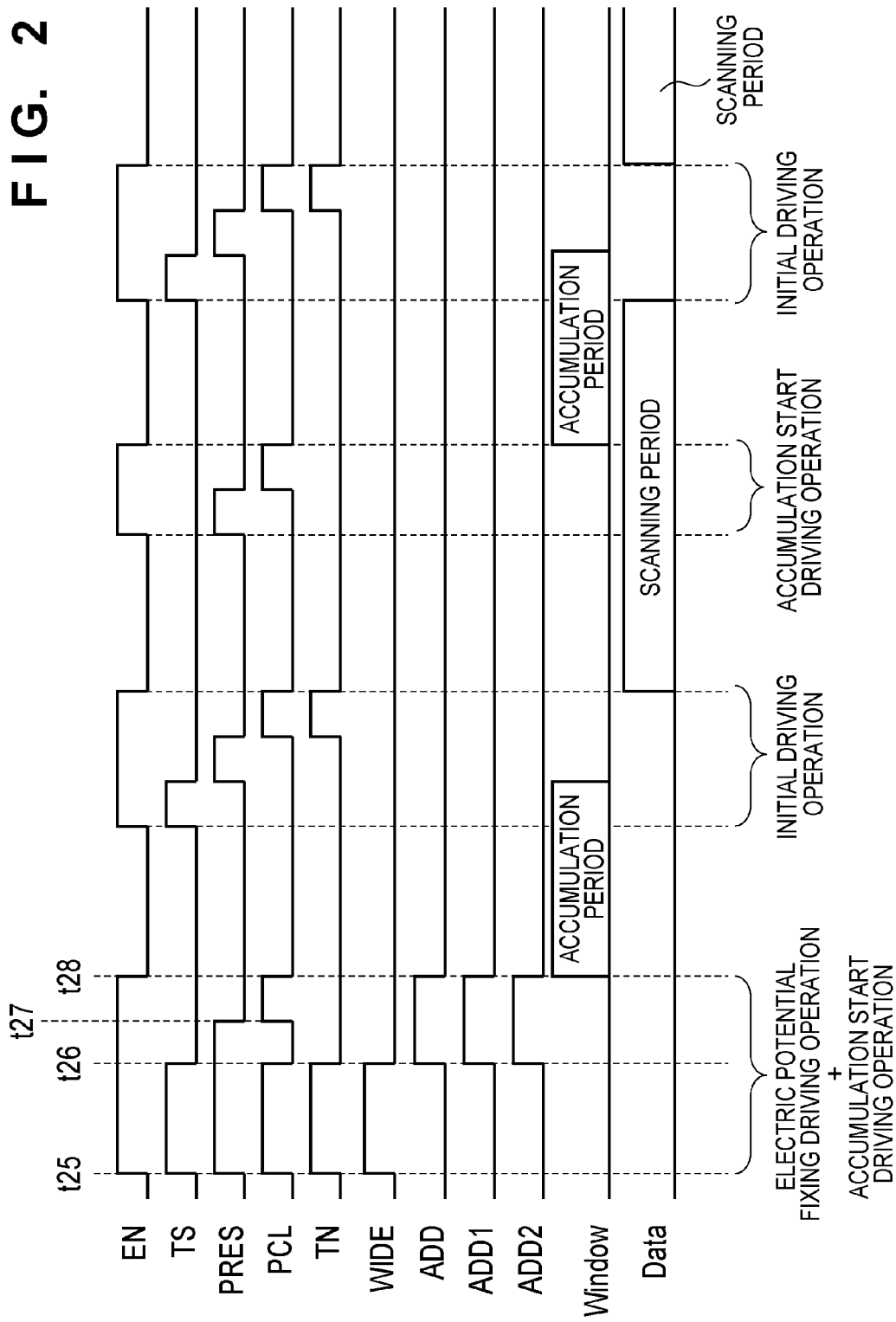
FIG. 2 is a timing chart showing the driving timing of a pixel circuit in the second embodiment.

Driving control of a CMOS imaging element according to the second embodiment of the present invention will be described next with reference to the timing chart of FIG. 2. Like FIG. 1, FIG. 2 is a timing chart of driving waveforms when performing the moving-image capturing operation from the first frame to the second frame in a pixel circuit corresponding to one pixel of the CMOS-type imaging element shown in FIGS. 6, 8A, and 8B. Assume that the pixel circuit settings are set to a high sensitivity and perform no pixel addition. This embodiment collectively performs the driving operation shown in FIG. 2 for all the pixels in the CMOS-type imaging element.

The timing chart of FIG. 2 differs from that of FIG. 1 in that the electric-potential-fixing-driving operation includes the accumulation-start-driving operation for the first frame at the start of the moving-image capturing operation. FIG. 2 will be described below in chronological order. As in the first embodiment, the apparatus performs the driving (electric-potential-fixing-driving operation) to set all the floating portions to a stable electric potential (fixed electric potential). At time t25, the apparatus changes an EN signal, the TS signal, the PRES signal, the PCL signal, the TN signal, and the WIDE signal from the low level to the high level. This turns on a reset switch M2, the clamp switch M5, the sample and hold switch M8, the sample and hold switch M11, a sensitivity switch M1, a selection switch M3, and selection switch M6. Referring to FIG. 6, stable electric potentials are respectively applied to all the portions between a transfer switch M9 on the input side of the pixel circuit and a transfer switch M12 on the output side.

After all the electric potentials in the CMOS-type imaging element are fixed, the apparatus changes the TS signal, the PCL signal, the TN signal, and the WIDE signal from the high level to the low level at time t26. While keeping the selection switch M3 and the reset switch M2 in an ON state, the apparatus starts the accumulation-start-driving operation from time t26.

At time t26, the apparatus changes an ADD signal, the ADD1 signal, and the ADD2 signal from the low level to the high level to fix the electric potentials of the pixel addition circuits shown in FIG. 8B.

At time t27, the apparatus changes the PRES signal from the high level to the low level to complete resetting. As a consequence, a reset voltage VRES is set on the first pixel amplifier M4 side of a clamp capacitor Ccl. At time t27, the apparatus changes the PCL signal from the low level to the high level to turn on the clamp switch M5, thereby setting a clamp voltage VCL on the second pixel amplifier M7 side of the clamp capacitor Ccl. The apparatus accumulates electric charge corresponding to the voltage difference between the clamp voltage VCL and the reset voltage VRES, and finishes clamping operation.

At time t28, the apparatus changes the EN signal, the PCL signal, the ADD signal, the ADD1 signal, and ADD2 signal from the high level to the low level to finish the combination of the electric-potential-fixing-driving operation. At time t28, the apparatus performs control to change the ADD signal, the ADD1 signal, and the ADD2 signal from the high level to the low level, together with the EN signal and the PCL signal. In this case, the pixel addition circuits shown in FIG. 8B, the clamp capacitor Ccl, and the floating diffusion capacitor Cfd are electrically disconnected from each other unless the apparatus sets the TS signal and TN signal to the high level. Therefore, this way of driving poses no problem.

After time t28, the apparatus operates according to a driving pattern similar to that for operation after time t13 in FIG. 1 in the first embodiment.

Operating each pixel circuit according to a combination of the electric-potential-fixing-driving operation and the accumulation-start-driving operation allows to perform the accumulation-start-driving operation at the same time when the electric-potential-fixing-driving operation ends. This makes it possible to shorten the time required to acquire an image of the first frame after each photoelectric conversion element starts the electric-potential-fixing-driving operation.

It is possible to reduce noise components and accurately correct fixed pattern noise by fixing the unstable voltages of the floating portions in the pixel circuit to a predetermined voltage of the power supply at a timing before the moving-image capturing operation by the imaging unit.

Third Embodiment

Figure 3:
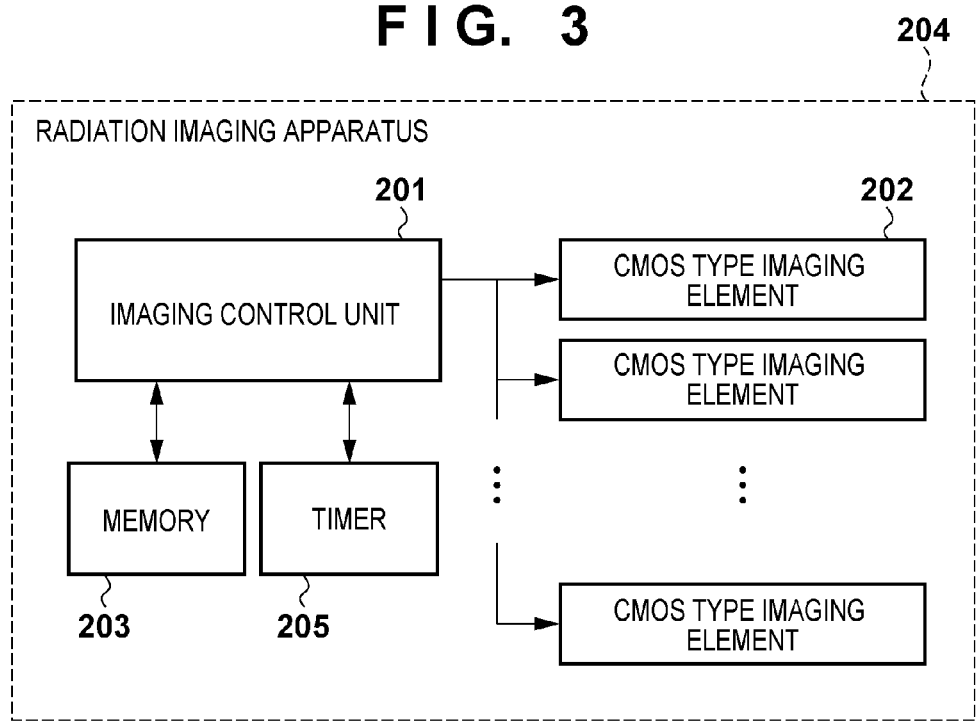
FIG. 3 is a block diagram showing the schematic arrangement of a radiation imaging apparatus according to the third embodiment.

FIG. 3 is a block diagram showing the schematic arrangement of a radiation imaging apparatus according to the third embodiment. All CMOS-type imaging elements 202 (pixel circuits) in a radiation imaging apparatus 204 are connected to an imaging control unit 201. Control signals from the imaging control unit 201 control the CMOS-type imaging elements 202 (pixel circuits). The radiation imaging apparatus 204 includes a timer 205 (timepiece unit) for measuring the time. The imaging control unit 201 stores the time when it has transmitted a control signal to each CMOS-type imaging element 202 (pixel circuit) to perform the electric-potential-fixing-driving operation in a memory 203 connected to the imaging control unit 201.

Assume that after the operator turns on the power supply of the radiation imaging apparatus 204, the apparatus acquires a moving image by the driving operation under the first settings, and then soon acquires a moving image upon changing the first settings to the second settings. When acquiring a moving image first after the power supply of the radiation imaging apparatus 204 is turned on, the electric potential differences between the respective floating portions in the CMOS-type imaging element 202 (pixel circuit) become unstable. This inevitably prolongs the time until the electric potentials of the floating portions become stable. When capturing a moving image again after capturing a moving image, since the apparatus has performed the electric-potential-fixing-driving operation once, the electric potentials of the floating portions are fixed in a shorter period of time. In some cases, there is no need to perform the electric-potential-fixing-driving operation. Whether to perform the electric-potential-fixing-driving operation or how much time the electric-potential-fixing-driving operation should be performed depends on the time elapsed since the previous electric-potential-fixing-driving operation has been done.

When capturing a moving image by the second imaging operation after capturing a moving image by the first imaging operation, the imaging control unit 201 compares the current time and the time stored in the memory 203 to calculate the elapsed time from the time when the imaging control unit 201 has performed previous the electric-potential-fixing-driving operation. It is possible to store, for example, a threshold time as a reference time for control of the electric-potential-fixing-driving operation in the memory 203 in advance. Alternatively, it is possible to set a threshold time via an operation input unit (not shown). The imaging control unit 201 can also compare a threshold TH with a calculated elapsed time TE and control the electric-potential-fixing-driving operation in accordance with the comparison result.

If, for example, the elapsed time falls within the threshold time (TE≤TH), the imaging control unit 201 can perform control not to perform the electric-potential-fixing-driving operation. If the elapsed time TE exceeds the threshold time TH (TE>TH), the imaging control unit 201 can perform control to perform the electric-potential-fixing-driving operation. The imaging control unit 201 causes a switch unit 910, an accumulation unit 920, a removal unit 930, and a holding unit 940, which constitute a pixel circuit, to operate to set an electric potential corresponding to a predetermined voltage of a power supply connected via the switch unit 910 in the accumulation unit 920, removal unit 930, and holding unit 940.

It is possible to use one or two or more threshold times (TH1 and TH2: TH1<TH2) in accordance with an imaging environment and imaging conditions for moving images. In this case, the imaging control unit 201 can compare the elapsed time TE with the first threshold time TH1 and the second threshold time TH2 and control the electric-potential-fixing-driving operation in accordance with the comparison result. If, for example, the elapsed time TE falls within the first threshold time TH1 (TE≤TH1), the imaging control unit 201 can perform control not to perform the electric-potential-fixing-driving operation. If the elapsed time TE exceeds the first threshold time TH1 and falls within the second threshold time TH2 (TH1<TE≤TH2), the imaging control unit 201 can perform control to perform the electric-potential-fixing-driving operation in a first electric potential fixing time TC1. If the elapsed time TE exceeds the second threshold time TH2, the imaging control unit 201 can perform control to perform the electric-potential-fixing-driving operation in a second electric potential fixing time TC2 longer than the first electric potential fixing time TC1. The above case has exemplified the use of the first threshold time TH1 and the second threshold time TH2 as a plurality of threshold times. However, the gist of the present invention is not limited to this. For example, the imaging control unit 201 can control the electric-potential-fixing-driving operation in multiple steps by using the elapsed time TE and N (natural number) threshold times.

The imaging control unit 201 changes the time of the electric-potential-fixing-driving operation in accordance with the comparison result between the elapsed time and a threshold time. This can reduce the time loss due to the electric-potential-fixing-driving operation until it is ready for application of radiation in a case in which the moving-image capturing operation is performed once, and then imaging operation is performed again.

The imaging control unit 201 may also use a method using a counter which is reset when the electric-potential-fixing-driving operation is performed, instead of using the memory 203 which stores the time when a control signal is transferred. The imaging control unit 201 can control the electric-potential-fixing-driving operation by referring to the value of the counter.

Fourth Embodiment

Figure 4:
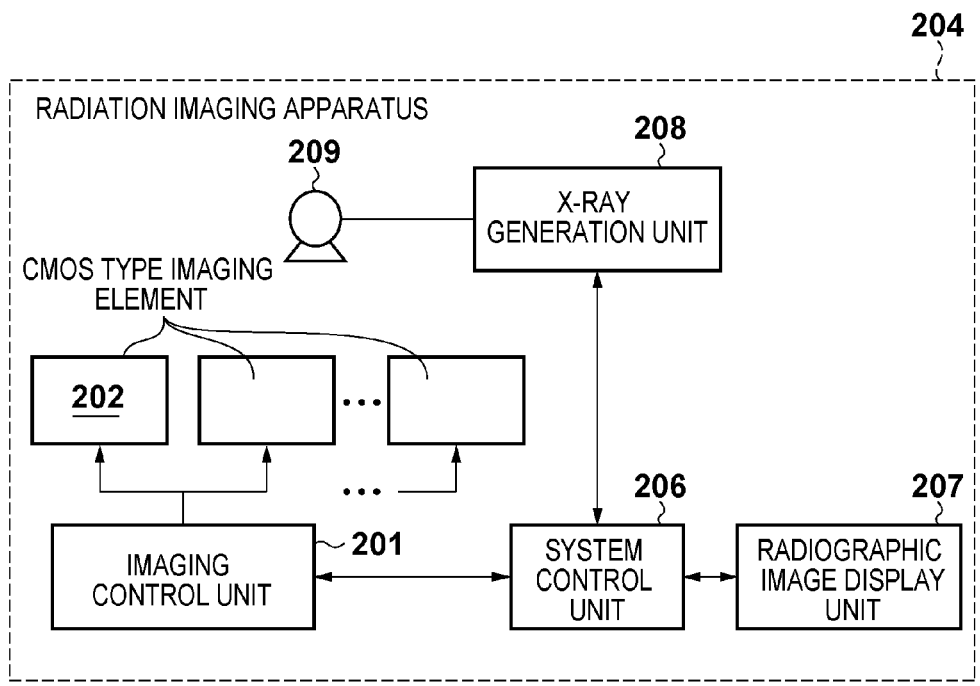
FIG. 4 is a block diagram showing the schematic arrangement of a radiation imaging apparatus according to the fourth embodiment.

FIG. 4 shows the schematic arrangement of a radiation imaging apparatus according to the fourth embodiment of the present invention. A radiation imaging apparatus 204 includes a system control unit 206 which controls the operation of the apparatus, a radiographic image display unit 207, and an X-ray generation unit 208 connected to an X-ray tube 209. All CMOS-type imaging elements 202 (pixel circuits) in the radiation imaging apparatus 204 are connected to an imaging control unit 201. Control signals from the imaging control unit 201 control the CMOS-type imaging elements 202 (pixel circuits).

The system control unit 206 has an image processing function, processes images captured by the CMOS-type imaging elements 202 (pixel circuits), and outputs the resultant data to the radiographic image display unit 207. At the time of imaging operation, the system control unit 206 synchronously controls the radiation imaging apparatus 204 and the X-ray generation unit 208. A scintillator (not shown) converts radiation transmitted through an object into visible light. The CMOS-type imaging elements 202 of the radiation imaging apparatus 204 then perform photoelectric conversion in accordance with the amount of light. The radiation imaging apparatus 204 performs A/D conversion after photoelectric conversion, and then transfers frame image data corresponding to the X-ray application to the system control unit 206. The image processing function of the system control unit 206 performs image processing. Thereafter, the radiographic image display unit 207 displays a radiographic image in real time. In this case, the system control unit 206 communicates with the imaging control unit 201 of the radiation imaging apparatus 204 by using commands. The imaging control unit 201 controls and makes driving settings for the power supplies of the CMOS-type imaging elements 202 in accordance with commands transmitted from the system control unit 206. Driving settings include setting of a sensitivity, the pixel addition, the frame rate, and the radiation accumulation time.

Figure 5:
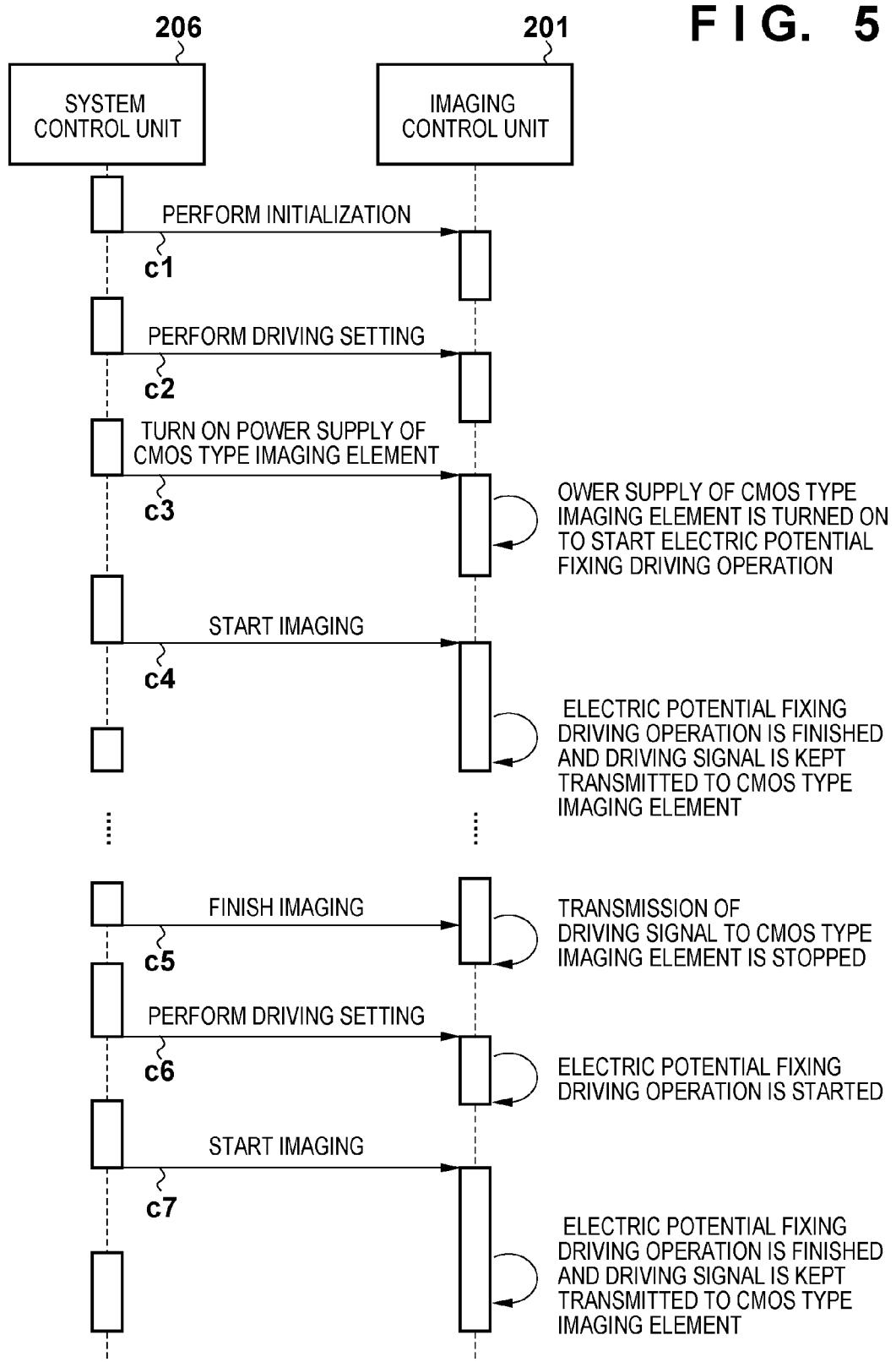
FIG. 5 is a view showing a driving procedure in an imaging control unit in a radiation imaging apparatus according to the fourth embodiment.

FIG. 5 is a view showing a driving procedure in the imaging control unit 201 in the radiation imaging apparatus 204 according to the fourth embodiment. A processing procedure will be described with reference to FIG. 5. The imaging control unit 201 has a communication function for communicating with the system control unit 206 wiredly or wirelessly. First of all, the system control unit 206 transmits a command for performing initialization of the radiation imaging apparatus 204 to the imaging control unit 201 (c1). The system control unit 206 then transmits setting commands for driving the CMOS-type imaging elements 202 (pixel circuits) to the imaging control unit 201 (c2). Upon receiving the setting commands, the imaging control unit 201 sets the sensitivity, the pixel addition, the frame rate, and the radiation accumulation time. The system control unit 206 then transmits commands for turning on the power supplies of the CMOS-type imaging elements 202 to the imaging control unit 201 (c3). Upon receiving the commands transmitted from the system control unit 206 in step c3, the imaging control unit 201 turns on the power supplies of the CMOS-type imaging elements 202 to cause them to start the electric-potential-fixing-driving operation. In this case, the order of steps c2 and c3 may be reversed. The system control unit 206 then transmits a command for starting imaging operation to the imaging control unit 201 (c4). Upon receiving the command transmitted in step c4, the imaging control unit 201 causes the CMOS-type imaging elements 202 to finish the electric-potential-fixing-driving operation and start the imaging-driving operation. The imaging-driving operation indicates driving operation started from time t13 in FIG. 1. Subsequently, the system control unit 206 transmits a command for finishing the imaging operation to the imaging control unit 201 at the imaging operation end timing (c5). Upon receiving the command transmitted in step c5, the imaging control unit 201 causes the CMOS-type imaging elements 202 to finish the imaging-driving operation.

When performing next imaging operation, the system control unit 206 transmits a command for performing driving setting to the imaging control unit 201 again (c6) to set the sensitivity, the pixel addition, the frame rate, and the radiation accumulation time again in the imaging control unit 201. Upon receiving the command transmitted in step c6, the imaging control unit 201 causes the CMOS-type imaging elements to start the electric-potential-fixing-driving operation. The system control unit 206 then transmits an imaging operation start command to the imaging control unit 201 (c7) to cause the CMOS-type imaging elements to start the imaging-driving operation. When finishing imaging operation, the system control unit 206 transmits an imaging-operation end command to the imaging control unit 201 at the imaging operation end timing as in step c5 described above. Upon receiving the transmitted imaging-operation end command, the imaging control unit 201 causes the CMOS-type imaging elements 202 to finish the imaging-driving operation.

As described above, the electric-potential-fixing-driving operation starts when the imaging control unit 201 receives a command from the system control unit 206 (step c2 or c6). When the imaging control unit 201 is to perform the electric-potential-fixing-driving operation after receiving the imaging-operation start command (step c4 or c7), the radiation imaging apparatus 204 is not permitted to apply radiation during the electric-potential-fixing-driving operation. For this reason, the operator cannot start radiation application at the timing when he/she wants to start imaging operation, and needs to operate the apparatus in consideration of a delay of the start of imaging operation due to the electric-potential-fixing-driving operation. According to this embodiment, however, it is possible to start the electric-potential-fixing-driving operation before receiving an imaging operation start command. This makes it possible to set a sufficient time for the electric-potential-fixing-driving operation. In addition, the operator can operate the radiation imaging apparatus without any consideration of a delay of the start of imaging operation due to the electric-potential-fixing-driving operation.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-219766, filed Sep. 29, 2010, which is hereby incorporated by reference herein in its entirety.

What is claimed is:

1. A radiation imaging apparatus comprising:
an imaging unit formed by arranging a plurality of pixel circuits, wherein each of the pixel circuits has: a pixel amplifier configured to output a voltage corresponding to the electric charge generated by a photodiode; a signal sample and hold switch configured to cause a signal hold capacitor to sample and hold the electric charge corresponding to the voltage; and a switch unit configured to apply a predetermined voltage between the pixel amplifier and the photodiode; and
an imaging control unit configured to control the operation of each of said plurality of pixel circuits so as to perform an imaging operation which causes the plurality of pixel circuits to output a signal corresponding to the electric charge held by the signal hold capacitor,
wherein said imaging control unit causes the signal hold capacitor to sample and hold electric charge corresponding to the predetermined voltage by operating the pixel amplifier, the signal sample and hold switch, and the switch unit before the imaging operation.

2. The apparatus according to claim 1,
wherein each of the plurality of pixel circuits further includes a noise sample and hold switch configured to cause a noise hold capacitor to sample and hold electric charge corresponding to a noise of the pixel amplifier, and
wherein said imaging control unit causes the noise sample and hold switch and the signal hold capacitor to sample and hold the electric charge corresponding to the predetermined voltage by operating the pixel amplifier, the noise sample and hold switch, the signal sample and hold switch, and the switch unit before the imaging operation.

3. The apparatus according to claim 2, wherein each of the plurality of pixel circuits further includes:
a signal addition circuit configured to connect the signal hold capacitor of a predetermined pixel circuit of the plurality of pixel circuits and the signal hold capacitor of another pixel circuit, different from the predetermined pixel circuit, of the plurality of pixel circuits; and
a noise addition circuit configured to connect the noise hold capacitor of the predetermined pixel circuit and the noise hold capacitor of the other pixel circuit,
wherein the signal addition circuit of the predetermined pixel circuit and the signal addition circuit of the other pixel circuit are connected,
wherein the noise addition circuit of the predetermined pixel circuit and the noise addition circuit of the other pixel circuit are connected, and said imaging control unit causes the pixel amplifier, the noise sample and hold switch, the signal sample and hold switch, the signal addition circuit, the noise addition circuit and the switch unit to operate before the imaging operation.

4. The apparatus according to claim 3, wherein each of the plurality of pixel circuits further includes:
an electric charge accumulation unit configured to accumulate electric charge generated by the photodiode;
another pixel amplifier configured to output a voltage corresponding to the electric charge accumulated by the electric charge accumulation unit;
a reset switch configured to supply a reset voltage to the electric charge accumulation unit; and
a clamp capacitor which is provided between the other pixel amplifier and the switch unit and between the pixel amplifier and the switch unit,
wherein said imaging control unit causes the pixel amplifier, the noise sample and hold switch, the signal sample and hold switch, the signal addition circuit, the noise addition circuit, the other pixel amplifier, the reset switch, and the switch unit to operate before the imaging operation.

5. The apparatus according to claim 4,
wherein each of the plurality of pixel circuits further includes a sensitivity switch configured to connect the electric charge accumulation unit and a dynamic range expansion capacitor,
wherein said imaging control unit causes the pixel amplifier, the noise sample and hold switch, the signal sample and hold switch, the signal addition circuit, the noise addition circuit, the other pixel amplifier, the reset switch, the sensitivity switch and the switch unit to operate before the imaging operation.

6. The apparatus according to claim 5,
wherein each of the plurality of pixel circuits further includes:
a selection switch configured to operate the pixel amplifier; and
another selection switch configured to operate the other pixel amplifier,
wherein said imaging control unit causes the selection switch, the noise sample and hold switch, the signal sample and hold switch, the signal addition circuit, the noise addition circuit, the other selection switch, the reset switch, the sensitivity switch, and the switch unit to operate before the imaging operation.

7. The apparatus according to claim 6, further comprising:
a timepiece unit configured to measure time; and
a storage unit configured to store data representing the time when said imaging control unit has transmitted a control signal to cause the selection switch, the noise sample and hold switch, the signal sample and hold switch, the signal addition circuit, the noise addition circuit, the other selection switch, the reset switch, the sensitivity switch, and the switch unit to operate, when a first imaging operation is to be performed,
wherein when performing a second imaging operation after the first imaging operation, if an elapsed time from the time represented by the data stored in said storage unit to a current time obtained by said timepiece unit exceeds a threshold time, said imaging control unit causes the selection switch, the noise sample and hold switch, the signal sample and hold switch, the signal addition circuit, the noise addition circuit, the other selection switch, the reset switch, the sensitivity switch, and the switch unit to operate for an electric potential fixing driving operation, and
wherein when performing the second imaging operation, if the elapsed time from the time represented by the data stored in said storage unit to the current time falls within a threshold time, said imaging control unit does not perform the electric potential fixing driving operation.

8. The apparatus according to claim 7, wherein said imaging control unit includes a communication unit configured to communicate with a system control unit configured to control operation of the radiation imaging apparatus, and
wherein upon receiving a command for turning on a power supply of said pixel circuit which is transmitted from said system control unit, said imaging control unit causes the selection switch, the noise sample and hold switch, the signal sample and hold switch, the signal addition circuit, the noise addition circuit, the other selection switch, the reset switch, the sensitivity switch, and the switch unit to operate.

9. The apparatus according to claim 8, wherein upon receiving a setting command for driving the pixel circuit which is transmitted from the system control unit, said imaging control unit causes the selection switch, the noise sample and hold switch, the signal sample and hold switch, the signal addition circuit, the noise addition circuit, the other selection switch, the reset switch, the sensitivity switch, and the switch unit to operate.

10. The apparatus according to claim 6, wherein each of the plurality of pixel circuits further includes:
a third pixel amplifier configured to output an voltage corresponding to the electric charge sampled and held by the signal hold capacitor; and
a fourth pixel amplifier configured to output a voltage corresponding to the electric charge sampled and held by the noise hold capacitor.

11. A radiation imaging apparatus comprising:
a power supply configured to supply a predetermined voltage;
an imaging unit formed by arranging pixel circuits in a two dimensional area; and
an imaging control unit configured to control the operation of each of said pixel circuits,
wherein when performing a second imaging operation after a first imaging operation, if an elapsed time from a time at which the first imaging operation has been performed exceeds a threshold time, said imaging control unit causes said power supply to supply the predetermined voltage to the pixel circuits and fix the voltage of a floating portion in the pixel circuits, and
wherein when performing the second imaging operation after the first imaging operation, if the elapsed time from the time falls within the threshold time, said imaging control unit does not fix the voltage of the floating portion.

* * * * *